US011565232B2

(12) United States Patent
Doucet et al.

(10) Patent No.: US 11,565,232 B2
(45) Date of Patent: Jan. 31, 2023

(54) DRUM AND DOOR ASSEMBLY FOR CATALYTIC MICROWAVE DEPOLYMERIZATION REACTOR

(71) Applicant: Pyrowave Inc., Oakville (CA)

(72) Inventors: Jocelyn Doucet, Montreal (CA); Jean-Philippe Laviolette, Montreal (CA)

(73) Assignee: Pyrowave Inc., Oakville (CA)

( * ) Notice: Subject to any disclaimer, the term of this patent is extended or adjusted under 35 U.S.C. 154(b) by 1010 days.

(21) Appl. No.: 16/321,715

(22) PCT Filed: Jul. 28, 2017

(86) PCT No.: PCT/CA2017/050906
§ 371 (c)(1),
(2) Date: Jan. 29, 2019

(87) PCT Pub. No.: WO2018/018154
PCT Pub. Date: Feb. 1, 2018

(65) Prior Publication Data
US 2019/0224640 A1 Jul. 25, 2019

Related U.S. Application Data

(60) Provisional application No. 62/368,306, filed on Jul. 29, 2016.

(51) Int. Cl.
*H05B 6/76* (2006.01)
*B01J 19/12* (2006.01)
(Continued)

(52) U.S. Cl.
CPC ............. *B01J 19/126* (2013.01); *B01J 3/03* (2013.01); *B01J 19/12* (2013.01); *B01J 19/18* (2013.01);
(Continued)

(58) Field of Classification Search
CPC .. H05B 6/6402; H05B 6/6405; H05B 6/6414; H05B 6/6417; H05B 6/705; H05B 6/707;
(Continued)

(56) References Cited

U.S. PATENT DOCUMENTS 3,796,977 A * 3/1974 Elliott ...................... H01Q 1/30
333/248
4,166,207 A * 8/1979 Burke ..................... H05B 6/763
174/377
(Continued)

FOREIGN PATENT DOCUMENTS

GB 2331687 A * 5/1999 ........... H05B 6/6405
JP 5-227942 A * 9/1993 ............ C12M 41/14

OTHER PUBLICATIONS

International Search Report, Canadian Intellectual Property Office, International Application No. PCT/CA2017/050906, dated Nov. 8, 2017, 4 pages.
(Continued)

*Primary Examiner* — Hung D Nguyen
(74) *Attorney, Agent, or Firm* — Taft Stettinius & Hollister LLP (57) ABSTRACT

A door assembly for a microwave reactor including a microwave waveguide to direct microwaves from an external microwave source to inside the microwave reactor, and having a waveguide interface for preventing backflow of a process gas into the waveguide; an inlet for entry of matter to be treated in the microwave reactor; a first seal at the periphery of the door assembly to sealably interface with a static front of the microwave reactor; a second seal inserted into a groove on an inside face of the door assembly to sealably interface with an opening of a microwave reactor drum, the groove having a width of about 12.9 inches (32.766 cm) divided by an integer, and the second seal configured to prevent solids and liquids from flowing out-
(Continued)

side of the reactor drum; and a ring choke to contact a choke arranged on the periphery of the opening of the reactor drum.

19 Claims, 7 Drawing Sheets (51) Int. Cl.
*B01J 19/18* (2006.01)
*C08J 11/10* (2006.01)
*H05B 6/64* (2006.01)
*H05B 6/80* (2006.01)
*B01J 3/03* (2006.01)

(52) U.S. Cl.
CPC ............ *C08J 11/10* (2013.01); *H05B 6/6402* (2013.01); *H05B 6/6414* (2013.01); *H05B 6/6417* (2013.01); *H05B 6/806* (2013.01); *B01J 2219/1215* (2013.01); *B01J 2219/1233* (2013.01); *B01J 2219/1236* (2013.01); *B01J 2219/1257* (2013.01); *B01J 2219/1269* (2013.01)

(58) Field of Classification Search
CPC .......... H05B 6/76; H05B 6/763; H05B 6/766; H05B 6/78; H05B 6/784; H05B 6/80; H05B 6/802; H05B 6/806; B01J 3/03; B01J 19/12; B01J 19/126; B01J 19/18; B01J 19/1818; B01J 19/1825; B01J 2219/1215; B01J 2219/1233; B01J 2219/1236; B01J 2219/1239; B01J 2219/1257; B01J 2219/1269; B01J 2219/1275; C08J 11/10
USPC ....... 219/678, 679, 680, 685, 686, 690–699, 219/736–743
See application file for complete search history.

(56) References Cited

U.S. PATENT DOCUMENTS

| | | | |
|---|---|---|---|
| 4,382,239 A * | 5/1983 | Chen et al. ............... | H01P 1/30 333/248 |
| 5,429,799 A | 7/1995 | Shieh et al. | |
| 2002/0096227 A1* | 7/2002 | Donohoe .......... | H01J 37/32458 141/98 |
| 2004/0055517 A1 | 3/2004 | Nunemacher | |
| 2012/0175364 A1* | 7/2012 | Kimrey, Jr. ............ | H05B 6/707 219/742 |
| 2013/0195726 A1* | 8/2013 | Norton ..................... | H05B 6/78 422/186.29 |
| 2013/0200071 A1* | 8/2013 | Mathis .................... | F27D 11/12 219/756 |

OTHER PUBLICATIONS

Written Opinion of the International Searching Authority, Canadian Intellectual Property Office; International Application No. PCT/CA2017/050906, dated Nov. 8, 2017, 5 pages.

* cited by examiner

DRUM AND DOOR ASSEMBLY FOR CATALYTIC MICROWAVE DEPOLYMERIZATION REACTOR

CROSS-REFERENCE TO RELATED APPLICATIONS

This application is a U.S. National Phase of International PCT Application No. PCT/CA2017/050906 filed on Jul. 28, 2017, which claims the benefit of U.S. Provisional Application No. 62/368,306 filed on Jul. 29, 2016, the contents of each application are hereby incorporated by reference in their entirety.

BACKGROUND

(a) Field

The subject matter disclosed generally relates to elements of microwave reactors. More specifically, the subject matter relates to door assemblies, drums and their use in Microwave depolymerization reactors.

(b) Related for Art

Microwave depolymerization uses an electromagnetic field that interacts with microwave absorbing material (the catalyst) to convert the electrical energy into heat. The electromagnetic field must be properly contained inside the reactor in order to ensure, safety around the equipment when operated. Although door chokes exist to contain microwave energy, no such choke technology exists to choke the rather high power microwave radiations used in a rotating cavity operating in a high temperature environment under thermal cycling.

During the depolymerization process, heat is transferred from catalyst material to the material being depolymerized by conduction. Therefore, a key requirement during this process is being able to intimately contact the catalyst material with the polymer material being depolymerized by avoiding segregation under mixing conditions. Typical approaches for avoiding segregation rely on the use of baffles to promote mixing. However, the use of baffles becomes rather difficult when a high energy electromagnetic field is present in the mixing cavity because it triggers electrical arcs that decrease the performance of the depolymerization process. Therefore, there is a need for technology to ensure proper mixing rotating drum while avoiding the presence of protrusions and sharp edges that will trigger electrical arcs. In addition, there is a need for technology that would allow the operation at high to in the presence of high power microwave radiations.

During microwave depolymerization, the presence of sharp edges and protruding elements can result in electric arcing and consequent damage to the reactor. In order to avoid this, sharp edges and protrusions have to be avoided, either by not including them in the initial design, or by polishing any problematic elements (e.g. edges, welds, etc.) prior to use of the reactor. The need to avoid sharp edges and protrusions may b problematic with mixing of the material being treated. In some other applications in absence of microwave radiations, mixing can be enhanced in a rotating drum by adding flat sections around that would generate discontinuities in the flow and promote mixing. However, when subject to thermal cycling and in presence of high energy electrical field, those flat surfaces are subject to thermal deformation which, under cycling, will generate mechanical fatigue inside the material and initiate cracks, that would trigger arcs under microwave radiations.

Therefore, there is a need for high temperature pyrolysis microwave reactors having alternate modes of mixing the material being treated therein.

Furthermore, under any circumstances, the process temperature drops below melting point of the liquid present ire the cavity due to loss of microwave power during normal operation of the reactor, the liquid content will solidify. As a result, sharp edges will be formed at the surface of the solidified material and it will become impossible to reheat the content of the reactor using microwave energy as it will trigger arcs initiated by the sharp edges.

Therefore, there is a need in a catalytic microwave pyrolysis depolymerization reactor for an alternate mean of heating the reactor to maintain reactor temperature above the melting point of the polymer liquid and above the dew point of the gas inside the reactor to avoid formation of sharp edges and avoid thermal shocks on the coupler's interface material.

SUMMARY

According to an embodiment, there is provided door assembly for a microwave reactor comprising:
- a microwave waveguide to direct microwave from an external microwave source to inside the microwave reactor, having a waveguide interface for preventing backflow of a process gas into the waveguide;
- an inlet for entry of matter to be treated in the microwave reactor;
- a first seat at the periphery of the door assembly, to sealably interface with a static front of the microwave reactor;
- a second seal, inserted into a groove on an inside face of the door assembly, to sealably interface with an opening of a microwave reactor drum, the groove having a width of about 12.9 inches (32.766 cm) divided by an integer the second seal to prevent solids and liquids from flowing outside of said reactor drum.
- a ring choke, to contact a choke arranged on the periphery of the opening of the reactor drum The door assembly may be further comprising an instrumentation port.

The waveguide interface may be configured to be at a temperature higher than the dew point of a gas inside the reactor.

The waveguide may comprise a heater.

The door assembly may further compose a gutter to divert flow of liquid from said waveguide interface.

The contact of the ring choke with the choke may be adjustable.

The groove on an inside face of the door assembly may be configured to avoid electrical arcing.

The door assembly may be further comprising a heating element.

The inlet has a diameter below the wavelength of the microwave at 915 MHz.

The inlet has a diameter of 12.9 m or less (32.766 cm or less).

The inlet has a diameter of 6 in or less (15.24 cm or less).

The groove may be on an annular surface of an insert configured to insert and seal an opening of the reactor drum.

The groove may be configured to avoid sharp edges, protrusions and combinations thereof.

The first and second seal may be made from a material having a low or high dielectric constant $\varepsilon'$.

The first and second seal are made from a material having a complex permittivity ε".

The material may be chosen from 99.5% purity alumina oxide, 99.8% purity alumina oxide, silica oxide, graphite, and combinations thereof.

The ring choke may comprise means to increase the pressure to modulate its position along the longitudinal axis of the reactor drum, to increase contact with the choke.

The means to increase the pressure may be a plurality of knobs located at the periphery of the ring choke.

The knobs may be sealed with a cap.

The ring choke may be made of brass

According to another embodiment, there is provided a microwave choke comprising:
- a choke having a front and a back, the back configured for being attached to and contacting the periphery of an opening of a drum, and the front having a groove having a width aid a depth configured to maximize impedance of the choke around at a frequency of about 915 MHz to about 2450 MHz;
- a finger ring, comprising a plurality of fingers to dissipate electromagnetic energy from the microwave, the ring being attached to the choke such that the fingers partly overlap the groove.

According to another embodiment, there is provided a microwave reactor drum comprising:
- a drum having an opening:
- a choke, having a front and a back, the back being attached to and contacting the periphery of the opening, and the front having a groove having a width and a depth configured to maximize impedance of the choke around at a frequency of about 915 MHz to about 2450 MHz;
- a finger ring, comprising a plurality of fingers to dissipate electromagnetic energy from the microwave, the ring being attached to the choke such that the fingers partly overlap the groove.

The width and the depth are configured to maximize impedance of the choke around at a frequency of about 915 MHz.

The width may be about $2^{11}/_{16}\pm^1/_8$ inches (6.82625±0.3175 cm) and the depth may be about $^5/_8\pm^1/_8$ inches (1.5875±0.3175 cm).

The choke may be welded to the drum.

The ring fingers may be spaced about 11.25 inches (28.575 cm) between each center.

The ring fingers may have a gap of about ¼ inch (0.635 cm) between each ring fingers.

The ring fingers may have height of about 1.875 inches (4.7625 cm).

The interior of the drum may be heated to avoid solidification of a material therein.

The finger ring may be attached to the choke with thermally expanding fastener.

The microwave choke or the microwave reactor drum may comprise an adjustment space to adjust said choke distance with said ring fingers for thermal expansion to maintain a front gap between said ring fingers and said static wall.

The interior of the drum may be heated with electrical wires, with steam, or a combination thereof.

According to another embodiment, there is provided a high temperature pyrolysis microwave reactor comprising.
- a reactor enclosure;
- a rotating drum the rotating drum being horizontally mounted in the enclosure, and having a frontal opening, the drum being eccentered by about 2° to about 7° relative to the longitudinal axis of the drum;
- a microwave source emitting microwaves within the rotating drum.

The drum may be eccentered by about 4°.

The rotating drum may comprise an inner drum and an outer drum.

The gap between said inner drum and said outer drum is isolated.

The drum may be a microwave reactor drum according to the present invention.

The high temperature pyrolysis microwave reactor of the present invention may comprise a door assembly according to the present invention.

The high temperature pyrolysis microwave reactor of the present invention drum may comprise a microwave reactor drum according to the present invention, and composing a door assembly according to the present invention.

Features and advantages of the subject matter hereof wilt become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will use noted that throughout the appended drawings, like features are identified by like reference numerals.

DETAILED DESCRIPTION

In embodiments there is disclosed a door assembly 10 for a microwave reactor. Now referring to FIGS. 1, 2 and 3, the door assembly 10 comprises a microwave waveguide 12, to direct microwave from an external microwave source to inside the microwave reactor. The microwave waveguide 12 has a waveguide interface 14 for preventing backflow of a process gas into the waveguide 12. In embodiments, the waveguide 12 may be a circular waveguide, or it may be a rectangular waveguide. Also present is an inlet 16, for entry of matter to be treated in the microwave reactor, such as for example the raw material such as plastics, or other polymeric materials, for example polystyrene, and may also be used to introduce other materials, such as water for steam generation inside the reactor when in use. In embodiments, the inlet can have a diameter below the wavelength of the microwave at 915 MHz (<12.9 in or 32.766 cm). In another embodiment, the inlet 16 will typically be below 6 inches n ammeters (15.24 cm), so as to avoid excessive microwave leakage outside of the inlet chute.

In embodiments, the surface temperature around the waveguide interface 14 should remain at a temperature higher than the dew point of the gas inside the reactor. It is preferable to avoid condensation of vapors on the surrounding surfaces in order to avoid the flow of condensed liquid onto the waveguide interface 14 and create thermal shock problems which would yield in complete rupture of the waveguide interface material. According to an embodiment, the waveguide interface 14 may be configured to be at a temperature higher than the dew point of a gas inside the reactor, for example, the waveguide 12 may comprise a heater.

Figure 7A:
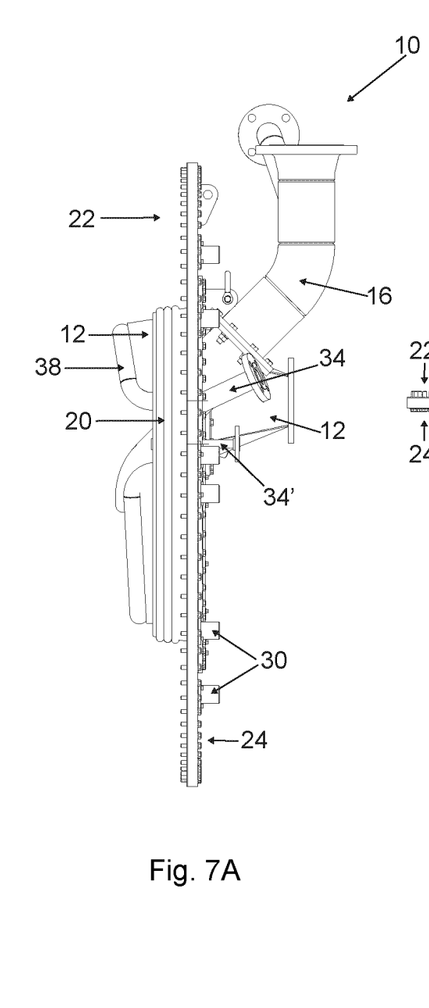
FIG. 7A illustrates a front view of right side of door assembly according to an embodiment of the present invention.
Figure 7B:
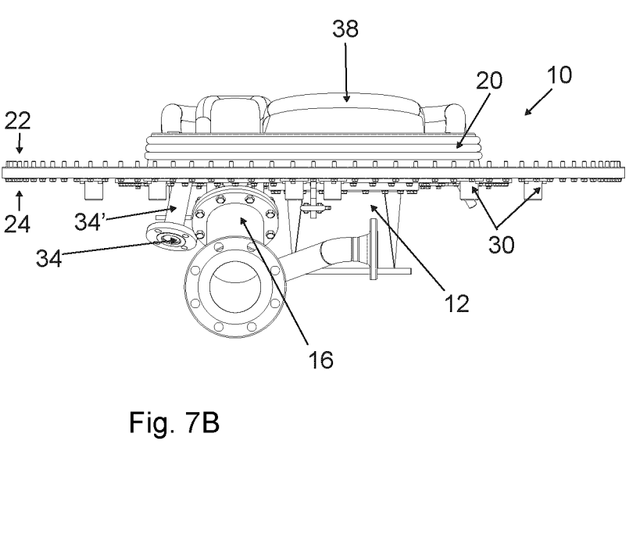
FIG. 7B illustrates a front view of right left of a door assembly according to an embodiment of the present invention.
Figure 7C:
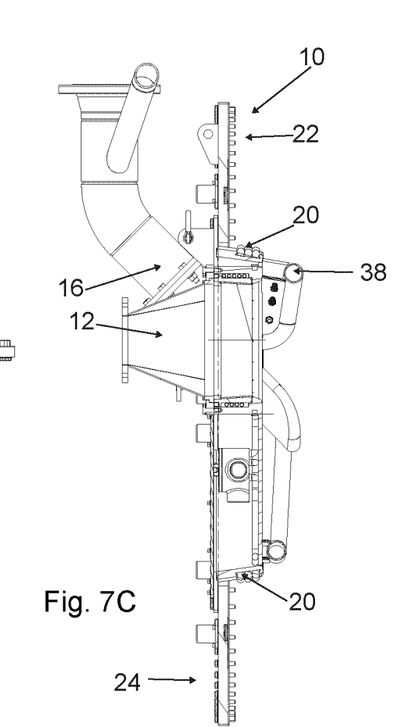
FIG. 7C illustrates a section view of a door assembly according to an embodiment of the present invention, showing the groove 26 of the first seal and the gutter 38.

According to another embodiment, rotation of the drum with liquid material under mixing may entrain liquid at the top of the door and that liquid may flow downward the reactor drum all day across the waveguide interface 14. To prevent this flow of liquid on the waveguide interface 14 material and prevent thermal shocks from damaging the surface material, a gutter 38 (See FIG. 7) is added on the door to divert flow of liquid from the waveguide interface 14.

Figure 3A:
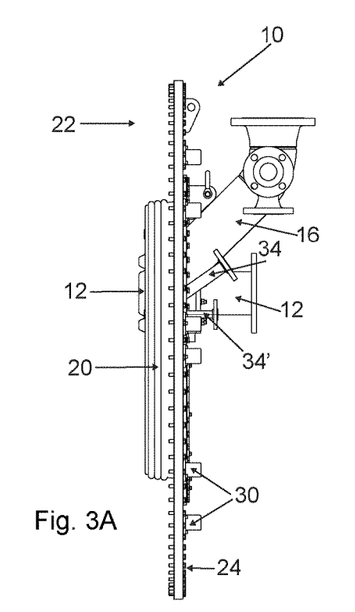
FIG. 3A illustrates a front view of right side of a door assembly according to an embodiment of the present invention.
Figure 3B:
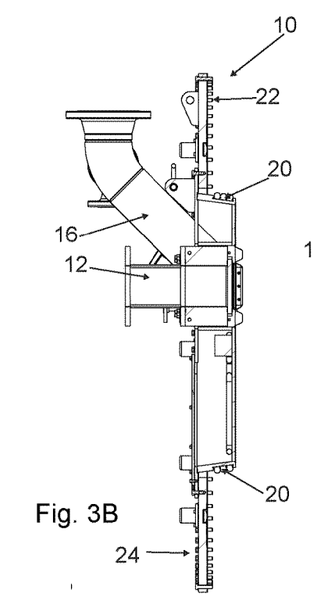
FIG. 3B illustrates a front view of right left of a door assembly according to an embodiment of the present invention.
Figure 3C:
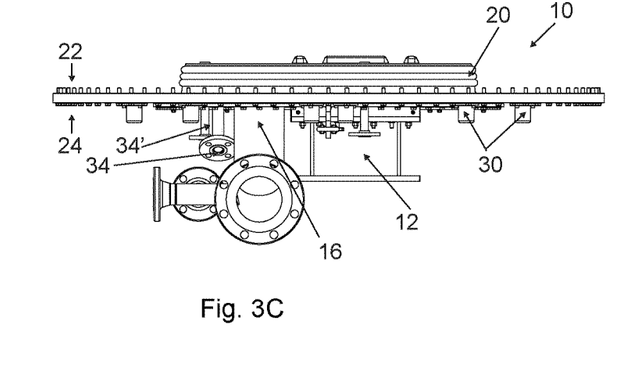
FIG. 3C illustrates a section view of a door assembly according to an embodiment of the present invention, showing the groove 26 of the first seal.
Figure 3D:
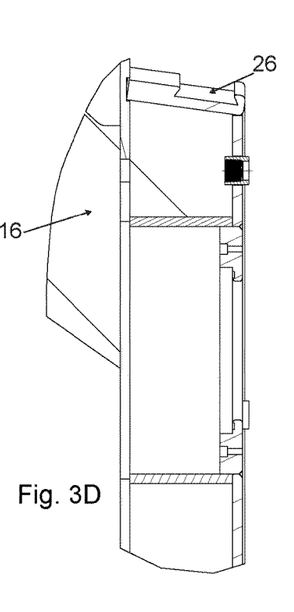
FIG. 3D illustrates a section view of a door assembly according to an embodiment of the present invention, showing the insert 32 on which the groove 26 of the first seal is illustrated.
Figure 3E:
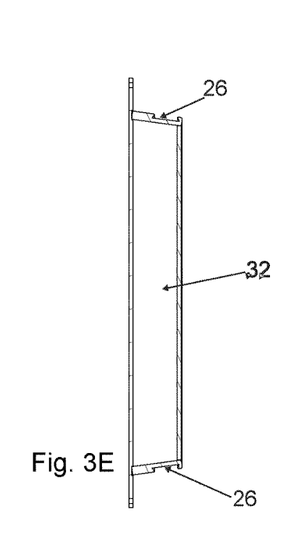
FIG. 3E illustrates a top down view of a door assembly according to an embodiment of the present invention.

The door assembly 10 also comprises a first seal 18, located at the periphery of the door assembly 10, which sealably interfaces with the static front of the microwave reactor. The door assembly 10 also comprises a second seal 20 to prevent solids and liquids from flowing outside of the reactor drum, which is inserted into a groove 26 on the inside face 22 of the door assembly 10, to sealably interface with an opening of a microwave reactor drum (not shown). According to an embodiment, the groove 26 is shown, on the annular surface of an insert 32, which is configured to insert and seal the opening of a reactor drum. The groove 26 has a width of about 12.9 inches (32.766 cm) divided by an integer 12.9/1, 12.9/2, 12.9/3, 12.9/4, 12.9/5, 12.9/6, 12.9/7, 12.9/8, 12.9/9, 12.9/10, etc.). In embodiments, the groove 26 on inside face 22 of the door assembly is configured to avoid electrical arcing. For example, in addition to the specific width, the groove is machined so as so avoid sharp edges and protrusions which may be causing arching. In embodiments, the first and second seal will be made from a material which has low or high dielectric constant $\varepsilon'$ and complex permittivity $\varepsilon''$. Suitable materials include but are not limited to 99.5% purity alumina oxide, 99.8% purity alumina oxide, silica oxide. The material for seal may also be a semiconductor such as graphite.

Figure 1A:
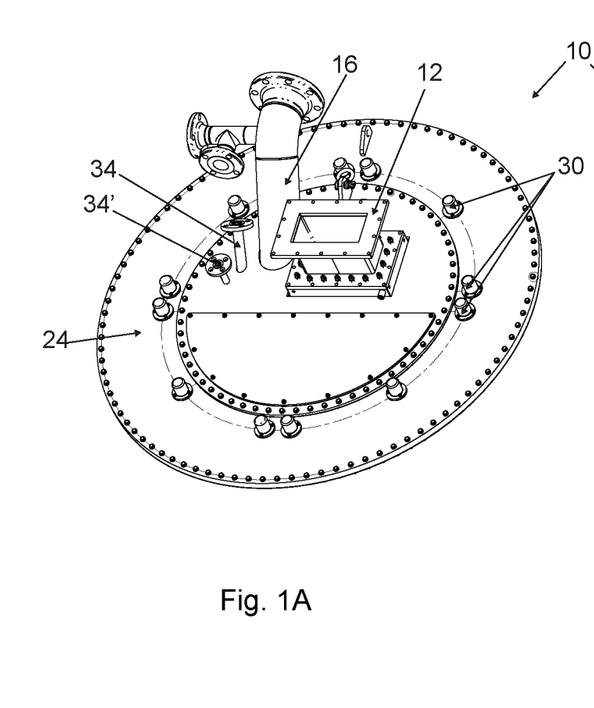
FIG. 1A illustrates a perspective view of the front of a door assembly according to an embodiment of the present invention.
Figure 1B:
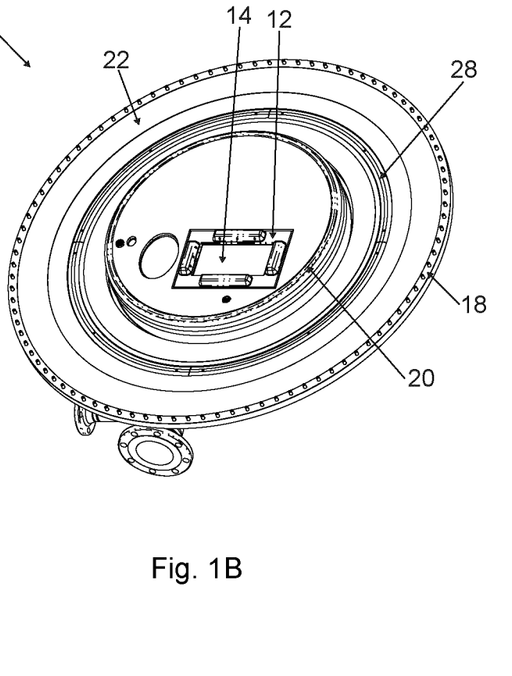
FIG. 1B illustrates a perspective view of the back of a door assembly according to an embodiment of the present invention.
Figure 2A:
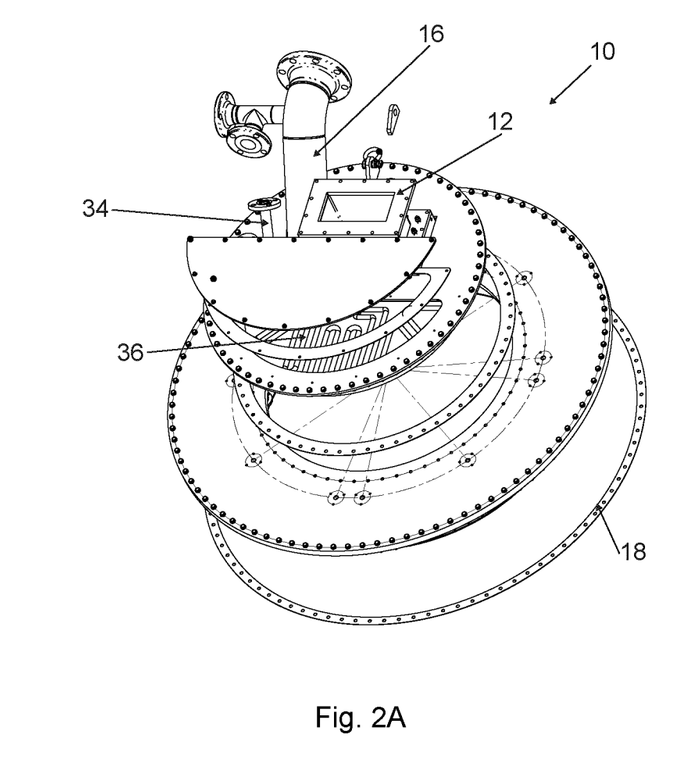
FIG. 2A illustrates an expanded view of the front of a door assembly according to an embodiment of the present invention.
Figure 2B:
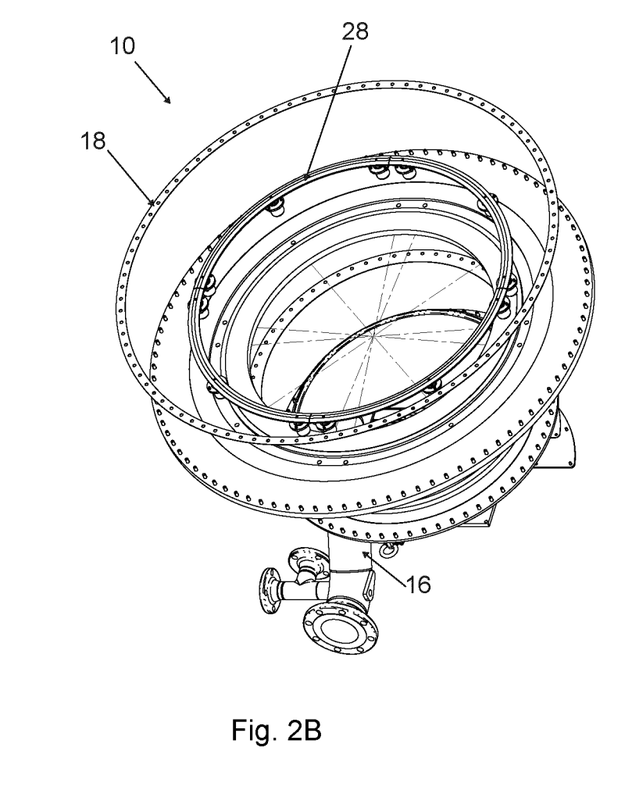
FIG. 2B illustrates an expanded view of the back of a door assembly according to an embodiment of the present invention.
Figure 4A:
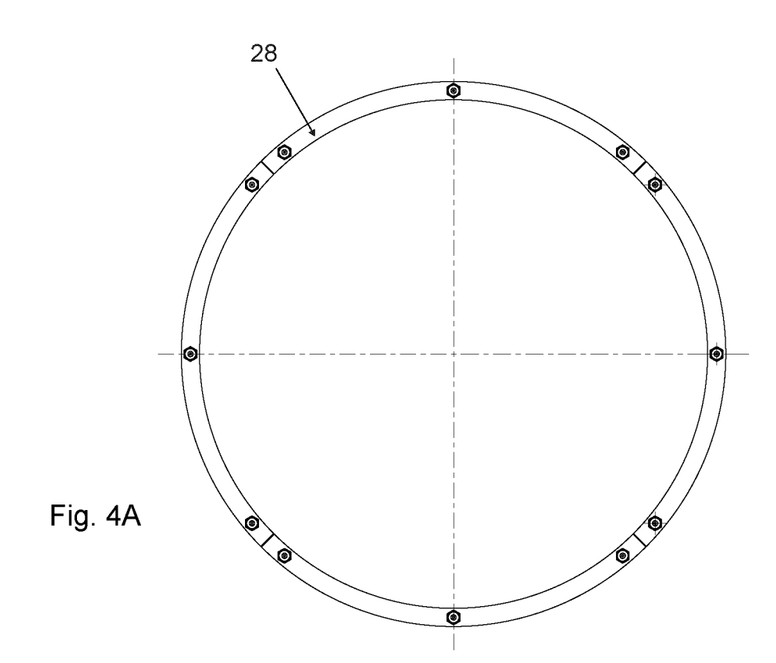
FIG. 4A illustrates a front view of a ring choice according to an embodiment of the present invention.
Figure 4B:
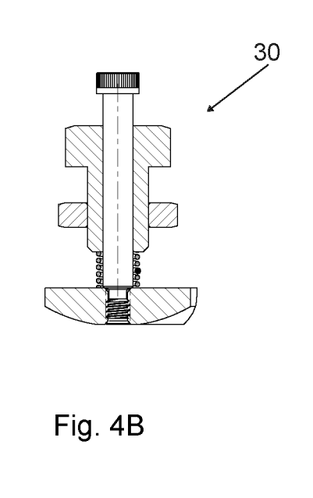
FIG. 4B illustrates a knob to modulate the pressure on the ring choke according to an embodiment of the present invention.
Figure 4C:
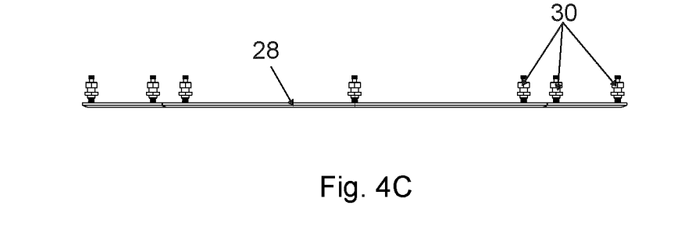
FIG. 4C illustrates a side view of a nog choke according to an embodiment of the present invention.

The door assembly 10 also comprises a ring choke 28. The ring choke 28, when the reactor is in use, will contact a choke arranged on the periphery of the opening of the reactor drum. The ring choke 28 prevents leakage of microwave from the inside of the reactor. Now referring to FIG. 4, in use, the contact between the ring choke 28 and the choke should be maintained at all times. Therefore, according to an embodiment, the contact between the ring choke 28 and the choke may b adjustable in order to increase pressure between the two and ensure appropriate contact. According to an embodiment, means to increase the pressure may be built into the ring choke 28 to modulate its position along the longitudinal axis of the reactor drum, such that contact is increased with the choke. According to an embodiment, as shown in FIG. 4, the adjustment may be performed by use of a plurality of knobs 30 located at the periphery of the ring choke 28. Upon actuation of the knob (e.g. turning them in this case), the position of the ring choke 28 may be modulated, and hence the pressure on the choke increased or decreased. In embodiments, the ring choke 28 may be made of brass so that it may slide over stainless steel without galling. Referring to FIG. 1A, the plurality of knobs 30 is illustrated as protruding from the exterior face 24 of the door assembly 10; which knobs pass through the exterior face 24 to attach to the corresponding apertures 32 (FIG. 4A). According to an embodiment, the knobs 30 may be sealed with a cap.

According to another embodiment, the door assembly 10 may also comprise an instrumentation port 34, 34', to insert instruments to measure, for example the temperature, the oxygen content, and/or the pressure inside the reactor, inside the reactor, the angular position of the reactor drum 100, the distance between the choke elements, etc.

According to another embodiment, the door assembly 10 may also comprise a heating element 36 (See FIG. 1A), which is configured to maintain the temperature of the door assembly sufficiently high in order to prevent condensation and/or to avoid solidification of a material treated the reactor thereon.

Figure 5A:
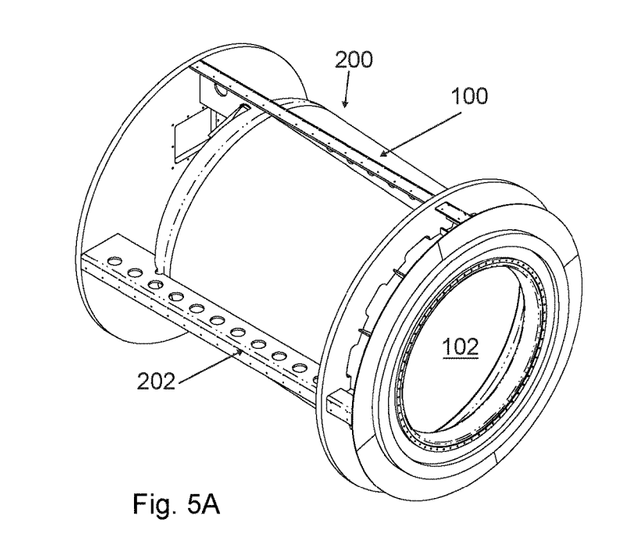
FIG. 5A illustrates a perspective view of high temperature pyrolysis microwave reactor according to an embodiment of the present invention.
Figure 5B:
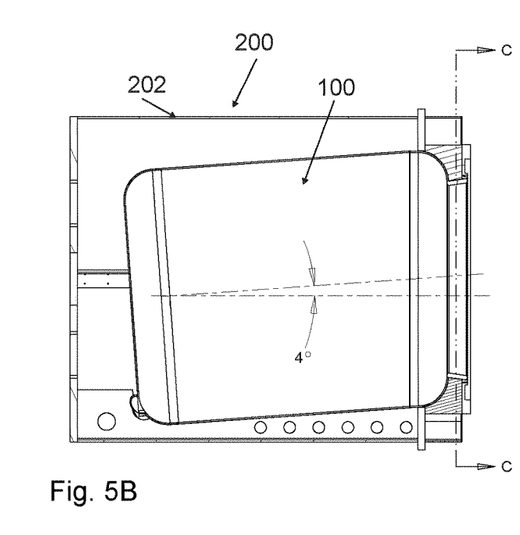
FIG. 5B illustrates a side view of a high temperature pyrolysis microwave reactor according to an embodiment of the present invention.
Figures 5C, 5D:
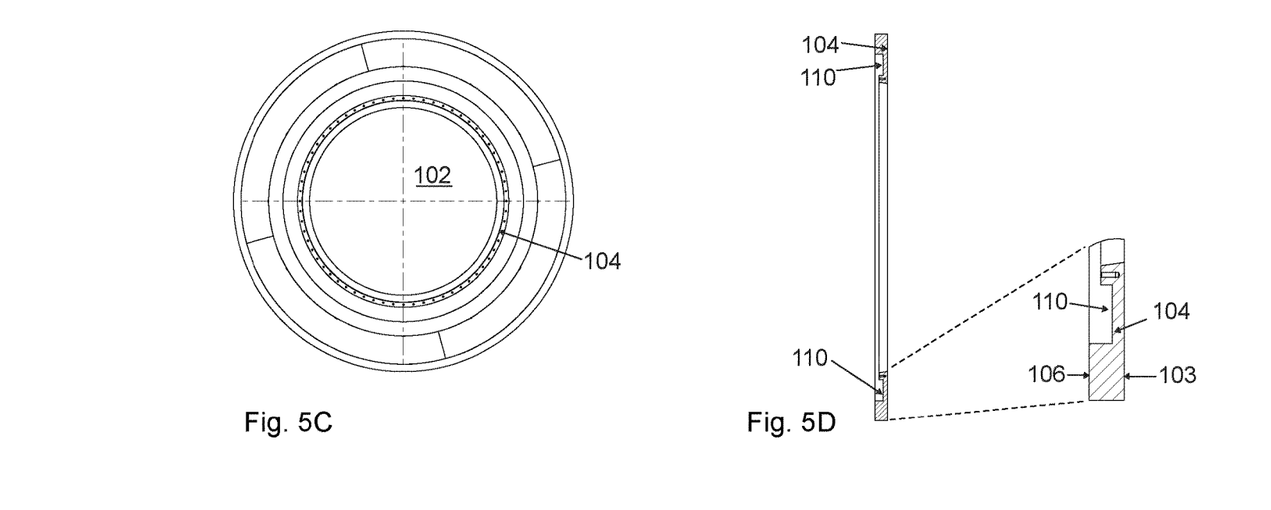
FIG. 5C illustrates a front view of a high temperature pyrolysis microwave reactor according to an embodiment of the present invention.
FIG. 5D illustrates a side view of a choke for use in a high temperature pyrolysis microwave reactor according to an embodiment of the present invention.
Figure 6A:
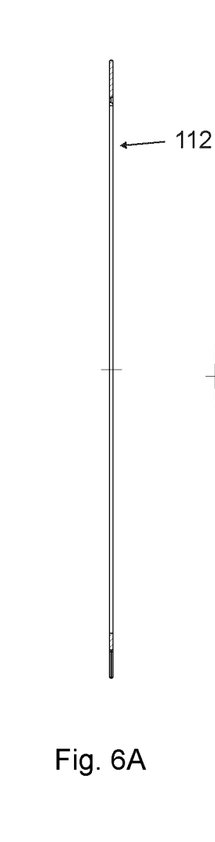
FIG. 6A illustrates side view of finger ring for in a high temperature pyrolysis microwave reactor according to an embodiment of the present invention.
Figures 6B, 6C, 6D, 6E:
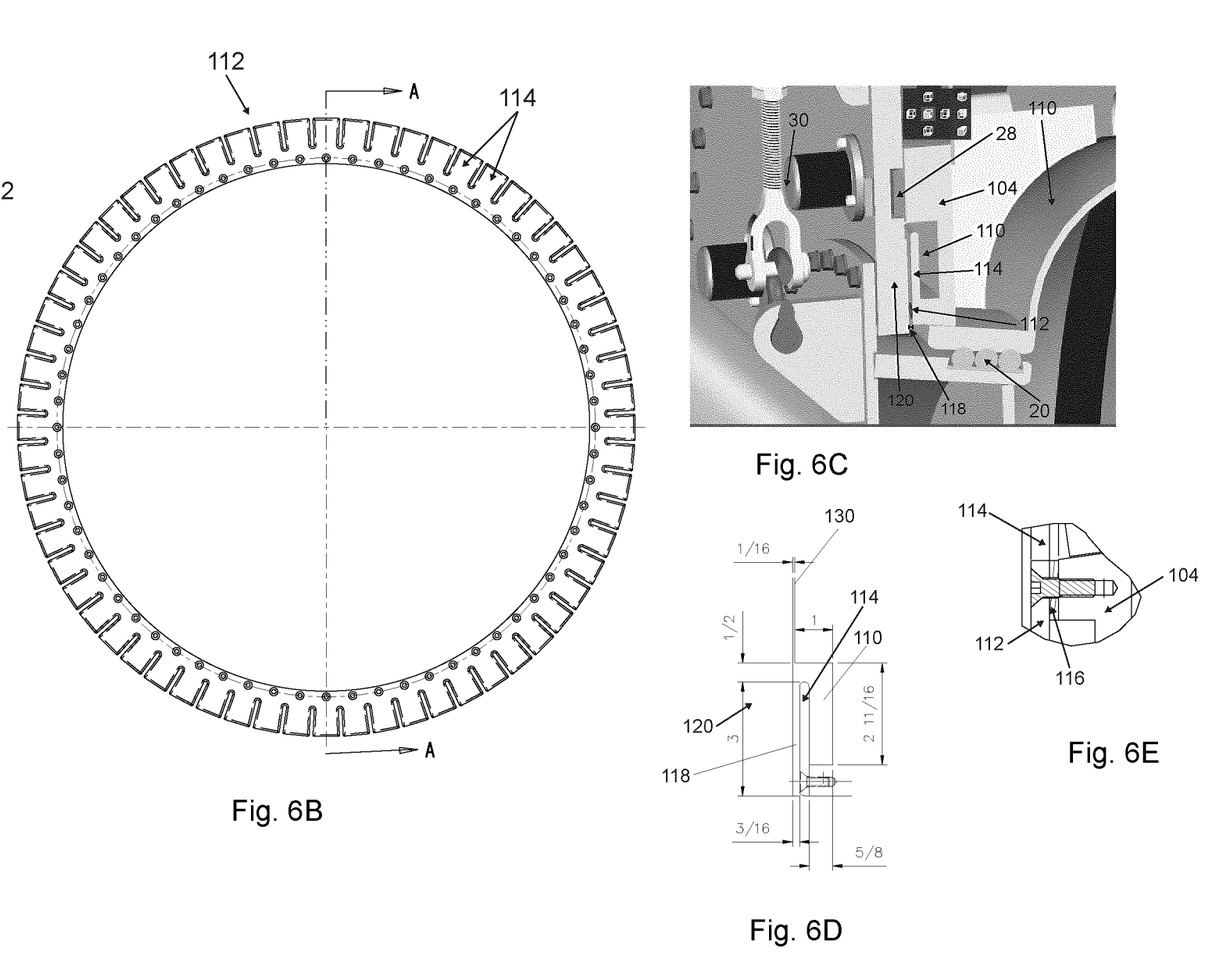
FIG. 6B illustrates a front view of finger ring for use in a high temperature pyrolysis microwave reactor according to an embodiment of the present invention.
FIG. 6C illustrates the relationship between the various parts in the door assembly of the present invention and the drum of the present invention, which may be used in a front view of a high temperature pyrolysis microwave reactor according to an embodiment of the present invention.
FIG. 6D illustrates the attachment of the finger ring to the choke, according to an embodiment of the present invention.
FIG. 6E illustrates the attachment of the finger ring to the choke, according to another embodiment of the present invention.

Now referring to FIGS. 5-6, in another embodiment there is disclosed a microwave reactor drum 100. The microwave reactor drum 100 comprises a drum having an opening 102, and a choke 104, having a front 106 and a back 108, the back 108 being attached to and contacting the periphery of the opening 102, and the front having a groove 110 having a width and a depth configured to maximize impedance of the choke around at a frequency of about 915 to 2450 MHz, for example of about $2^{11}/_{16} \pm \frac{1}{8}$ inches (6.82625±0.3175 cm) and a depth of about $\frac{5}{8} \pm \frac{1}{8}$ inches (1.5875±0.3175 cm), which is selected to maximize impedance around a frequency of 915 MHz so that the microwave energy that leaks out of the reactor is curtailed. The specific, dimensions of the groove 110 allow the choke 104 to curl the electrical field present when the microwave reactor is in use, and contains the electromagnetic radiations inside the reactor. In an embodiment, the choke 104 is welded to the drum 100.

The choke 104 with the finger ring 112 is generally designed to have a maximum impedance around a frequency of 915 MHz so that the microwave energy that leaks out of the gap 118 is les than 1 mV.

The microwave choke 104 is attached to a finger ring 112, comprising a plurality of fingers 114 to dissipate electromagnetic energy from the microwave (FIG. 6). The finger ring 112 is attached to the choke 104 such that the fingers 114 partly overlap the groove 110 (FIG. 6C). The role of the choke finger ring 112 is to create the boundary between gap 118 and groove 110 in the choke 104. The appropriate gap 118 transforms high impedance at gap 130 to low impedance, the spacing between the fingers 114 is designed as such because when the microwave power is on there will be a high level of surface current flowing. Too small of a space between the fingers 114 and the current will jump the gap and create an arc, too large of a space and its purpose of a boundary is null. If there are no gaps in the ring fingers 114 the ring will over heat. According to an embodiment, the ring fingers 114 are spaced by about 11.25 inches (28.575 cm) between each center, with a gap of about ¼ inch (0.635 cm) and a height of about 1.875 inches (4.7625 cm).

According to an embodiment, the finger ring 112 may be bolted to the choke 104. According to another embodiment, the finger ring 112 is attached to the choke 104 with thermally expanding fasteners, such as illustrated in FIG. 6D, which shows the finger ring 112 and finger 114 bolted to the choke 104, and a space 116 is present to allow adjustment by adding variable thickness shims for thermal expansion in order to maintain the front gap 118 between the choke fingers 114 and the static wall 120 within tolerances of $\frac{1}{16}$" (0.15875 cm), Some adjustment (space 116) is required to adjust the choke 104 distance with maximum tolerances of $\frac{1}{16}$" (0.15875 cm). The width of gap 118 between the choke fingers 114 and static wall 120 is about $\frac{3}{16} \pm \frac{1}{8}$ of an inch (0.47625±0.3175 cm).

The ring choke 28 is there to ensure that the gap 130 (FIG. 6D) in the choke 104 stays as small as possible especially during the expected expansion of the applicator as it heats.

According to another embodiment, the microwave reactor drum 100 may comprise means to heat the interior of the drum (i.e. the inner drum) to avoid solidification of a material therein after a microwave pyrolysis reaction, or to liquefy a material after it as solidified. According to an embodiment, the inner drum is heated with electrical wires to maintain the inner wall at a certain temperature (for example 200° C., or a minimum of 200° C., or higher, or lower, depending or the material treated it the reactor) and avoid solidification of melted plastic or wax material at any given time. According to another embodiment steam could be used to heat the inner drum.

During microwave pyrolysis, the presence of sharp edges and protruding elements can result in electric arcing and consequent damage to the reactor. In order to avoid this, sharp edges and protrusions have to be avoided, either by not including them in the initial design, or by polishing any problematic elements (e.g. edges, welds, etc.) prior to use of the reactor. The need to avoid sharp edges and protrusions may be problematic with mixing of the material being treated. Indeed, under thermal treatment, such as in a high temperature pyrolysis microwave reactor, the presence of flat surfaces prevents the proper mixing of the treated material and catalyst.

To address these constraints, in another embodiment there disclosed a high temperature pyrolysis microwave reactor 200. Now referring to FIGS. 5 and 6. The high temperature pyrolysis microwave reactor comprises a reactor enclosure 202, and a rotating drum 100 horizontally mounted in the enclosure 202, and having a frontal opening 102. The rotating drum 100 is eccentered by about 2° to about 7° relative to the longitudinal axis "L" of the drum 100, such that upon rotation, the material therein will be mixed by the wavelike motion of the rotating drum 100, and a microwave source emitting microwaves within the rotating drum. The eccentricity is required to provide mixing without baffles which otherwise would trigger arcs in the cavity in presence of high electromagnetic field. According to an embodiment, the rotating drum 100 is eccentered by about 2° to about 7°, or from about 2° to about 6°, or from about 2° to about 5°, or from about 2° to about 4°, or from about 2° to about 3°, or about 3° to about 7°, or from about 3° to about 6°, or from about 3° to about 5°, or from about 3° to about 4°, or about 4° to about 7°, or from about 4° to about 6°, or from about 4° to about 5° or about 5° to about 7°, or from about 5° to about 6°, or about 6° to about 7°, or 2°, 3°, 4°, 5°, 6°, 7°.

In another embodiment, the rotating drum 100 may comprise and inner drum and an outer drum. According to another embodiment the gap between the inner drum and the outer drum may be isolated.

According to another embodiment, all the radius of no sharp edges and angles should be present in the zone where the microwave field is emitted, to prevent or reduce electrical arcing. Therefore, in embodiments, any manufactured part that ends being present in the zone where the microwave field is emitted should have a radius that is ⅛ of an inch or more (0.3175 cm).

According to embodiments, the high temperature pyrolysis microwave reactor 200 of the present invention may comprise a microwave reactor drum 100 according to the present invention. In another embodiment, the high temperature pyrolysis microwave reactor 200 of the present invention may comprise a door assembly 10 according to the present invention. According to another embodiment, the high temperature pyrolysis microwave reactor 200 of the present invention may comprise a microwave reactor drum 100 according to the present invention and a door assembly 10 according to the present invention.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A door assembly for a microwave reactor, comprising:
   a microwave waveguide to direct microwaves from an external microwave source to inside the microwave reactor, said microwave waveguide having a waveguide interface for preventing backflow of a process gas into said microwave waveguide;
   an inlet for entry of matter to be treated in said microwave reactor;
   a first seal at a periphery of said door assembly, to sealably interface with a static front of said microwave reactor;
   a second seal, inserted into a groove on an inside face of said door assembly, to sealably interface with an opening of a microwave reactor drum, said groove having a width of about 12.9 inches (32.766 cm) divided by an integer, said second seal to prevent solids and liquids from flowing outside of said reactor drum; and
   a ring choke, to contact a choke arranged on a periphery of said opening of said reactor drum;
   wherein a contact of said ring choke with said choke is adjustable, and said ring choke comprises means to increase a pressure to modulate its position along the longitudinal axis of said reactor drum, to increase contact with said choke.

2. The door assembly of claim 1, further comprising an instrumentation port.

3. The door assembly of claim 1, wherein said waveguide interface is configured to be at a temperature higher than a dew point of a gas inside the microwave reactor.

4. The door assembly of claim 3, wherein said microwave waveguide comprises a heater.

5. The door assembly of claim 1, further comprising a gutter to divert flow of liquid from said waveguide interface.

6. The door assembly of claim 1, wherein said groove on said inside face of said door assembly is configured to avoid electrical arcing.

7. The door assembly of claim 6, wherein said groove is configured to avoid sharp edges, protrusions and combinations thereof.

8. The door assembly of claim 1, further comprising a heating element.

9. The door assembly of claim 1, wherein said inlet has a diameter below the wavelength of the microwave at 915 MHz.

10. The door assembly of claim 9, wherein said inlet has a diameter of 12.9 in or less (32.766 cm or less).

11. The door assembly of claim 9, wherein said inlet has a diameter of 6 in or less (15.24 cm or less).

12. The door assembly of claim 11, wherein said material is chosen from 99.5% purity alumina oxide, 99.8% purity alumina oxide, silica oxide, graphite, and combinations thereof.

13. The door assembly of claim 1, wherein said groove is on an annular surface of an insert configured to insert and seal an opening of said microwave reactor drum.

14. The door assembly of claim 1, wherein said first and second seal are made from a material having a low or high dielectric constant $\varepsilon'$.

15. The door assembly of claim 1, wherein said first and second seal are made from a material having a complex permittivity $\varepsilon'$.

16. The door assembly of claim 1, wherein said means to increase the pressure is a plurality of knobs located at a periphery of the ring choke.

17. The door assembly of claim 16, wherein said plurality of knobs are sealed with a cap.

18. The door assembly of claim 1, wherein said ring choke is made of brass.

19. A microwave reactor system comprising:
   the door assembly and the microwave reactor of claim 1 including the microwave reactor drum and the ring choke choke, the door assembly being mounted to the microwave reactor; said ring choke having a back and a front, the front of the ring choke being provided with a choke groove; and
   a finger ring comprising a plurality of fingers to dissipate electromagnetic energy, said finger ring being attached to the ring choke such that said fingers partly overlap said choke groove.

* * * * *